Feb. 13, 1934.  J. W. SMITH  1,947,116

GRADING MACHINE

Filed Nov. 13, 1930   2 Sheets-Sheet 1

INVENTOR
John W. Smith
BY
Mitchell & Bechert
ATTORNEY

Feb. 13, 1934. J. W. SMITH 1,947,116
GRADING MACHINE
Filed Nov. 13, 1930 2 Sheets-Sheet 2
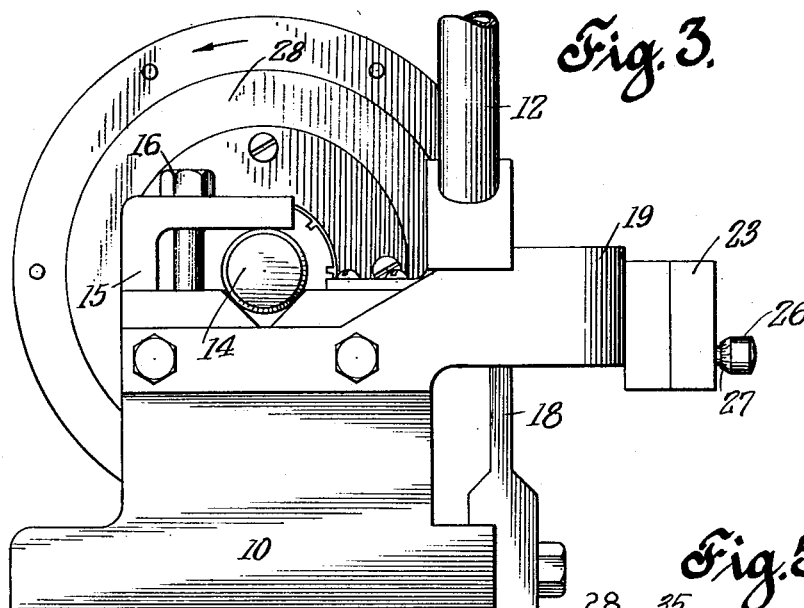
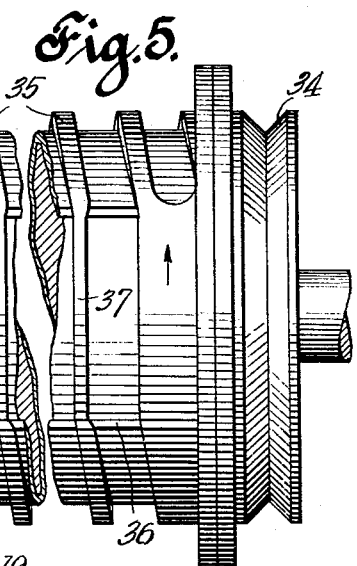
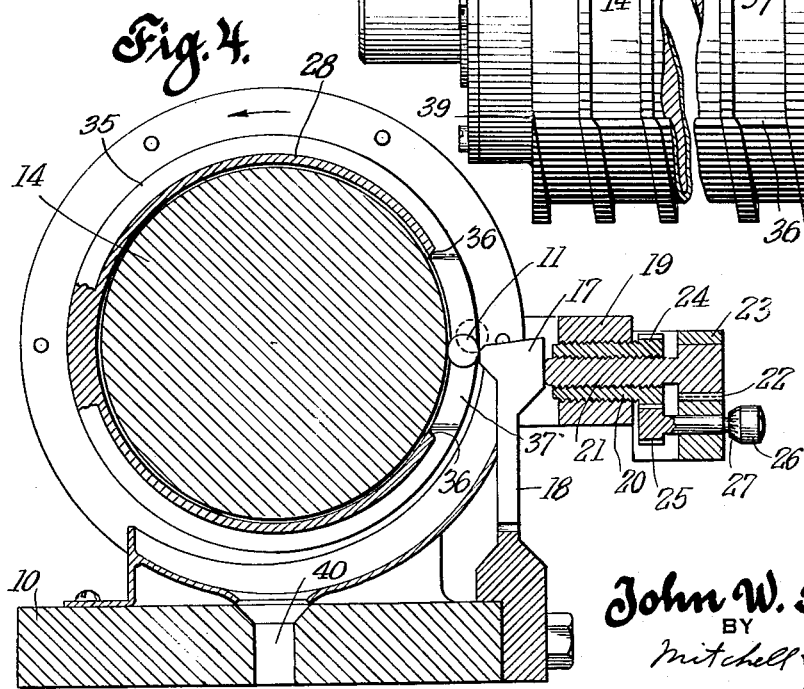
INVENTOR
John W. Smith
BY
Mitchell & Bechert
ATTORNEY Patented Feb. 13, 1934

1,947,116

UNITED STATES PATENT OFFICE 1,947,116

GRADING MACHINE

John W. Smith, New Britain, Conn., assignor to The Fafnir Bearing Company, New Britain, Conn., a corporation of Connecticut Application November 13, 1930
Serial No. 495,346

13 Claims. (Cl. 209—99)

My invention relates to a grading machine for grading articles according to size and especially for grading balls and rollers such as are used in anti-friction bearings.

It is the principal object of the present invention to provide improved automatic means for effecting the sorting and grading of articles such as balls and rollers, which will be of simple and sturdy construction and not likely to get out of order. It is a further object to provide a grading machine having a plurality of gaging passages which can be finely adjusted in size. It is another object to provide a grading machine having improved details of construction looking to simplicity and ease of operation. Other objects and features of the invention will become apparent on reading the accompanying specification.

Briefly stated, in a preferred form of the invention I employ a plurality of gates, one wall of each gate being adjustable to and from the opposite wall thereof, and means, preferably in the form of a rotating screw, for moving the articles to be graded into position adjacent these gates so that each article will be graded by passing through one of the gates.

In the drawings which show, for illustrative purposes only, a preferred form of the invention—

Fig. 3 is an end elevation of the grading machine shown in Fig. 1;

Fig. 4 is a transverse section taken upon the plane of the line 4—4 of Fig. 2;

Fig. 5 is a side elevation of certain parts detached and broken away at the mid portion.

Figure 1:
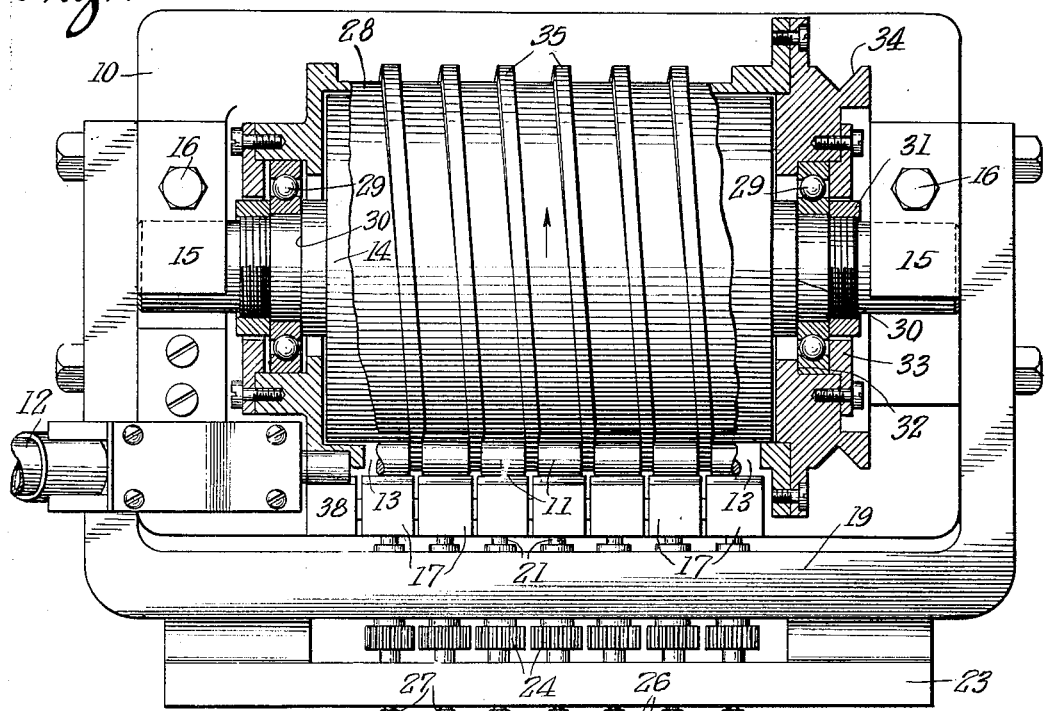
Fig. 1 is a plan view of a grading machine embodying features of my invention, parts being shown in central horizontal section.
Figure 2:
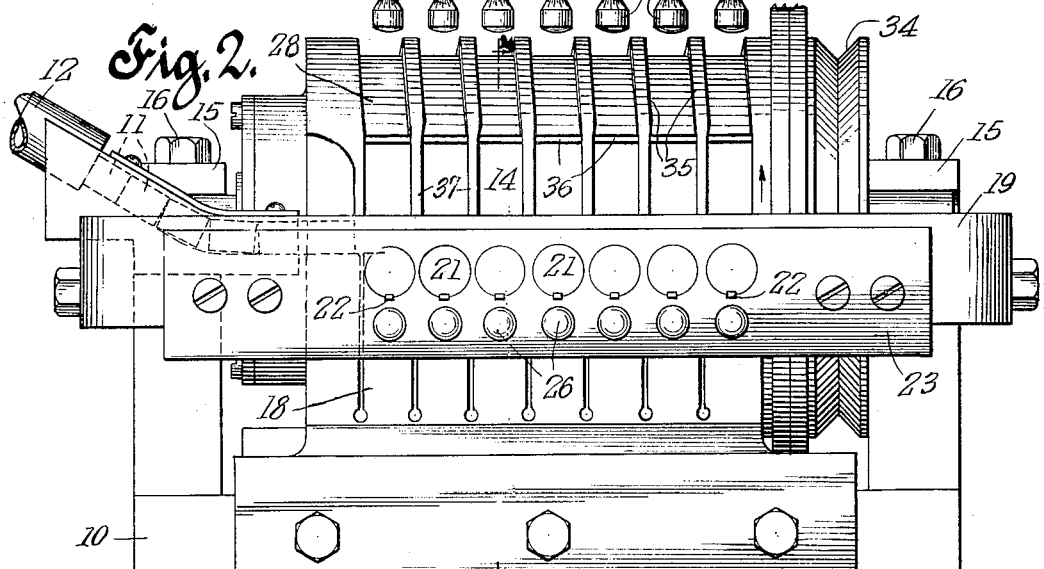
Fig. 2 is a side elevation of the grading machine shown in Fig. 1.

In said illustrative drawings, 10 indicates the base of a grading machine for grading articles such as balls and rollers. In the drawings the articles being graded are the rollers 11. A suitable conveyor is provided for conveying the articles to be graded to the machine, a conduit 12 being shown in the drawings for this purpose. 13—13 are gates for grading the articles to be graded, one wall of each gate being adjustable to and from the opposite wall thereof. The walls of each gate may be contoured to conform to the contour of the articles being graded. In the preferred form of the invention shown in the drawings one wall of each of the gates is a fixed abutment and the opposite wall of each gate is a movable abutment. The fixed and movable abutments may be of any convenient form. In the particular form shown in the drawings the fixed abutment is in the form of a cylindrical body 14 which is clamped to the base 10 by means of clamp members 15 and bolts 16. The movable abutments are the free ends of members 17 which are attached at their opposite ends to the base 10. Each member 17 is reduced in section intermediate between its ends as shown at 18 so as to provide an integral flexible shank support whereby its free end can have a limited degree of motion. Any convenient number of gates 13 may be provided. In the drawings I show seven of these.

Means are provided for adjusting the movable abutments 17 so that the gates 13 can be made to progressively increase in size in predetermined gradations. These means are shown in Fig. 4. 19 is a member rigidly attached to the base 10 and having a series of threaded holes therein in which are engaged the male threads of differential screws 20. Engaging with the female threads of the differential screws 20 are the screws 21, the front ends of which bear against the free ends of the members 17. Each of the screws 21 has a rearwardly projecting portion which is splined by means of a spline 22 to a member 23 which is fixedly attached to the member 19. Each of the differential screws 20 has a pinion 24 thereon which is engaged by a pinion 25 which is journaled in the member 23. A handle 26 is provided for rotating the pinion 25 and this handle is provided with a micrometer scale 27. Rotation of the handle 26 flexes the member 17 and adjusts the opening of the gate 13.

Means are provided for moving the articles to be graded adjacent to the gates 13. In the form shown in the drawings the movement of the articles to be graded is accomplished by means of the cylinder 28. This cylinder is supported so as to be rotatable and so as to have no longitudinal movement. In the form shown in the drawings I make the cylinder 28 hollow and support it on anti-friction bearings 29—29 at each end. The inner race of each bearing is held in place against a shoulder 30 on the hub of the body 14 by means of a nut 31 which engages with a thread on said hub. The outer race of each bearing is held in place between a shoulder 32 on the cylinder 28 and a cover plate 33 which is fixedly attached to the cylinder 28. The cylinder 28 is rotated uninterruptedly by means of a belt (not shown) which engages a pulley 34 attached to the cylinder 28.

On the exterior of the cylinder 28 are ribs 35—35 each in the form of an advancing spiral, each turn being interrupted by a straight portion 37. These ribs engage the articles to be graded and cause them to pass over the gates 13—13 in succession. The cylinder 28 has longitudinal openings or slots through the wall thereof between the straight portions 37 of the spiral thread. The longitudinal edges of these slots between the said portions 37—37 are shown at 36—36. Preferably the straight portions 37—37 are relieved so as to increase the longitudinal distance between them to thereby avoid any binding between the rib and the articles being graded when the article is in the grading position between the drum 14 and a member 17. The end of the rib 35 at the receiving end of the cylinder 28 is in the form of a wedge 39.

The operation of the machine is as follows:

The article to be graded passes down through the conduit 12 and the weight of the articles behind it delivers it to the top surface of a receiving member 38. The position of the article to be graded (in this case a roller) on the receiving member 38 is shown by the dotted circle in Fig. 4. The rotation of the cylinder 28 forces the wedge 39 (Fig. 5) between the article and the next following article. The form of the rib 35 at the left end of the cylinder 28 is such that after an article has been separated from the next following article by the wedge 39 the left-hand side of the rib will block the exit of the conduit 12 and prevent the delivery of the next following article to the receiving member 38 until the cylinder 28 has revolved nearly a complete turn. At the same time that the wedge 39 separates the article from the next following article the right-hand side of the rib 35 engages the left-hand side of the article and moves it longitudinally so as to cause it to pass successively over the various gates 13—13 step by step while said cylinder continues to advance. As these gates increase progressively in size, the article will finally find one of these gates through which it may pass whereupon it will fall into and through a passage 40 in the base of the machine to a suitable hopper. It will be understood that a separate passage 40 and a separate hopper are provided for each of the gates 13—13. When an article does not pass through a gate 13 it will be dislodged from the gate by the ascending longitudinal edge or abutment 36 and will be transferred by the right-hand edge of the rib 35 to the next larger gate 13. The tops of the members 17 are given a suitable slope so as to return articles dislodged by the abutment 36 to the grading position which is shown by the full line circle 11 in Fig. 4. It will be noted that the articles to be graded are, by the peculiar formation of the screw or spiral, intermittently shifted from one gate to another, in which position each article may pause for a short period.

While the invention has been described in considerable detail and one specific form shown in the drawings, it is to be understood that the invention may be otherwise embodied and employed in connection with grading machines of various types other than that herein shown.

I claim:

1. In a grading machine, a plurality of gates, an integral flexible shank support for said gates whereby such gates may be separately adjustable to and fro, and means for moving step by step articles to be graded into position adjacent said gates while said means continues to move so that each article will be graded by passing through one of said gates.

2. In a grading machine, a plurality of gates, one wall of each gate being adjustable to and from the opposite wall thereof, a spiral thread for moving articles to be graded over said gates, a portion of each turn of said thread being straight instead of spiral, whereby each article will be conveyed to and passed over said gates successively until it reaches the gate adapted to pass the same.

3. In a grading machine, a fixed abutment, a plurality of movable abutments, said fixed and movable abutments forming a plurality of gates progressively increasing in size, means to adjust the distances between said movable abutments and said fixed abutment, and a spiral screw feeding means comprising a plurality of turns of a thread, part of each turn being straight, whereby the article to be graded will be intermittently shifted from one gate to another until each article finds the gate through which it can pass.

4. In a grading machine, a rotatable cylinder having a series of slots therein, a stationary abutment within the cylinder, a plurality of movable abutments outside of said cylinder, said abutments and said cylinder forming a plurality of passages, means to rotate said cylinder with spiral threads around that part of the cylinder between the slots operating to move articles to be graded adjacent to said passages, whereby each article will be graded by passing through one of said passages.

5. In a grading machine, a rotatable cylinder, a rib on the exterior of said cylinder, said rib being in the form of an advancing spiral, a part of each turn of said rib being straight instead of spiral, a plurality of gates, means to rotate said cylinder, said rib operating to intermittently move articles to be graded over said gates, whereby each article will be graded by passing through one of said gates.

6. In a grading machine, a rotatable cylinder, an advancing spiral rib on said cylinder, said cylinder being slotted longitudinally at one side between the turns of said rib, a plurality of gates, one wall of each of said gates being adjustable to and from the opposite wall thereof, means to rotate said cylinder, said rib operating to move articles to be graded over said gates, whereby each article will be graded by passing through one of said gates.

7. In a grading machine, a rotatable hollow cylinder having a longitudinal opening through the wall thereof, an abutment within the cylinder and abutment outside of said cylinder forming a plurality of gates, means to rotate said cylinder, and means on said cylinder operating to move articles to be graded over said gates, whereby each article will be graded by passing through one of said gates.

8. In a grading machine, a rotatable hollow cylinder having a longitudinal opening through the wall thereof, a fixed abutment within said cylinder, a plurality of movable abutments outside of said cylinder, said fixed and movable abutments forming a plurality of gates, means to rotate said cylinder, said cylinder operating to move articles to be graded over said gates, whereby each article will be graded by passing through one of said gates.

9. In a grading machine, a rotatable hollow cylinder having a longitudinal opening through the wall thereof, abutments inside and outside of said cylinder forming the walls of gate passages, a rib on the exterior of said cylinder, said rib being in the form of an intermittently advancing spiral, means to rotate said cylinder, said rib operating to move articles to be graded over said gates, whereby each article will be graded by passing through that one of said gates to which it is adapted.

10. In a grading machine, a rotatable cylinder, gaging abutments inside and outside of said cylinder forming a series of gates, a spiral rib and a longitudinal abutment on the exterior of said cylinder, means to rotate said cylinder to cause said longitudinal abutment to dislodge articles lodged in said gates and said rib operating to transfer said articles to larger gates.

11. In a grading machine, a rotatable hollow cylinder having a longitudinal opening through the wall thereof, an abutment within said cylinder, a plurality of movable abutments outside of said cylinder, said abutments forming a plurality of gates progressively increasing in size, means to rotate said cylinder, and means operating to move articles lodged in said gates and transfer said articles to larger gates.

12. In a grading machine, means providing a plurality of individual gaging passages progressively increasing in size, and means for transferring articles to be graded intermittently from one passage to another and causing the same to pause over said passages, said means comprising a rotatable element having a spiral passage therearound, a portion of said passage in each turn of the spiral being straight, for the purpose described.

13. In a grading machine, a plurality of individual gates, one wall of each gate being adjustable to and from the other wall, and means for transferring articles to be graded intermittently and successively into position over said gates, and causing said articles to pause in said position, said means comprising a rotatable cylindrical member having a channel extending around the same from end to end, the major portions of said channel being spiral, and minor portions being straight, said cylindrical member passing between said walls.

JOHN W. SMITH.